US009973477B2

(12) United States Patent
Schieferstein et al.

(10) Patent No.: US 9,973,477 B2
(45) Date of Patent: May 15, 2018

(54) METHOD AND SYSTEM FOR SECURE REQUESTING OF AN OBJECT VIA A COMMUNICATIONS NETWORK

(71) Applicant: treefish GmbH, Wiesbaden (DE)

(72) Inventors: Tim-Florian Schieferstein, Wiesbaden (DE); Patrick-Emil Zorner, Wiesbaden (DE); Julia Wiedemann, Wiesbaden (DE); Georg Muller, Wiesbaden (DE)

(73) Assignee: treefish GmbH, Wiesbaden (DE)

( * ) Notice: Subject to any disclaimer, the term of this patent is extended or adjusted under 35 U.S.C. 154(b) by 561 days.

(21) Appl. No.: 14/602,795

(22) Filed: Jan. 22, 2015

(65) Prior Publication Data
US 2015/0135330 A1  May 14, 2015

Related U.S. Application Data

(63) Continuation of application No. PCT/EP2014/061768, filed on Jun. 5, 2014.

(30) Foreign Application Priority Data

Jun. 5, 2013 (DE) ........................ 10 2013 105 793

(51) Int. Cl.
G06F 7/04 (2006.01)
G06F 17/30 (2006.01)
(Continued)

(52) U.S. Cl.
CPC ............ H04L 63/04 (2013.01); H04L 9/3236 (2013.01); H04L 63/0428 (2013.01);
(Continued)

(58) Field of Classification Search
CPC ....................... H04L 63/04–63/0421
See application file for complete search history.

(56) References Cited

U.S. PATENT DOCUMENTS 5,960,411 A * 9/1999 Hartman ............ G06Q 10/087
705/26.8
7,188,080 B1  3/2007 Walker et al.
(Continued)

FOREIGN PATENT DOCUMENTS

EP          2456246 A1    5/2012

OTHER PUBLICATIONS

English translation of Wikipedia, "Checksum", Apr. 2013, URL: https://en.wikipedia.org/wiki/Checksum.
(Continued)

Primary Examiner — Daniel Potratz
(74) Attorney, Agent, or Firm — Myers Wolin, LLC

(57) ABSTRACT

A method for requesting an object by means of a client system, which is coupled to a server system operatively via a communications network is provided, wherein a server means of the server system receives via the communications network a request message from an electronic document displayed at a client system, the request message comprises at least a first parameter, which identifies a user of the client system, and a second parameter, which identifies the requested object, the server means evaluates the parameters of the received request message, wherein data for the first parameter assigned to the user and data for the second parameter assigned to the object are determined, wherein the respective data are stored in a storage means of the server system, and after a successful evaluation, the requested object is provided for transmission to the user.

14 Claims, 2 Drawing Sheets

(51) Int. Cl.
*H04N 7/16* (2011.01)
*H04L 29/06* (2006.01)
*H04L 9/32* (2006.01)
*H04L 29/08* (2006.01)

(52) U.S. Cl.
CPC ........ *H04L 63/0838* (2013.01); *H04L 63/108* (2013.01); *H04L 63/1483* (2013.01); *H04L 67/02* (2013.01)

(56) References Cited

U.S. PATENT DOCUMENTS

| | | | |
|---|---|---|---|
| 2003/0233329 | A1 | 12/2003 | Laraki et al. |
| 2005/0091492 | A1* | 4/2005 | Benson .................. G06Q 20/02 713/170 |
| 2007/0136279 | A1 | 6/2007 | Zhou et al. |
| 2010/0057549 | A1 | 3/2010 | Boal |
| 2012/0317028 | A1* | 12/2012 | Ansari ............... G06Q 20/0655 705/44 |
| 2013/0124422 | A1* | 5/2013 | Hubert ............... G06Q 20/3827 705/71 |
| 2013/0167210 | A1* | 6/2013 | Chu ....................... H04L 9/083 726/6 |
| 2013/0212269 | A1* | 8/2013 | Kuosa ................. G06F 21/6218 709/225 |

OTHER PUBLICATIONS

Wikipedia, "Session fixation", May 28, 2013, URL: https://en.wikipedia.org/wiki/Session_fixation.
English translation of German Office Action issued for corresponding German Patent Application No. 10 2013 105 793.4 dated Apr. 21, 2016.
English translation of German Examination Report issued for corresponding German Patent Application No. 10 2013 105 793.4 dated May 23, 2014.
International Search Report, dated Sep. 18, 2014, for International Application No. PCT/EP2014/061768.

* cited by examiner

METHOD AND SYSTEM FOR SECURE REQUESTING OF AN OBJECT VIA A COMMUNICATIONS NETWORK

CROSS REFERENCE TO RELATED APPLICATIONS

This application is a continuation of International Application No. PCT/EP2014/061768, filed Jun. 5, 2014, which claims priority to German Application No. 10 2013 105 793.4, filed Jun. 5, 2013, the contents of which are incorporated by reference herein.

FIELD OF THE INVENTION

The invention relates to a method for requesting an object by means of a client system, which is operatively coupled to a server system via a communications network. Further, the invention relates to a system for requesting an object by means of a client system which may be coupled operatively to a server system via a communications network.

BACKGROUND OF THE INVENTION AND PRIOR ART

It is known to order products or to request information on certain products in the internet, whereby the ordered products or the information on the products are delivered to the purchaser by mail. Hereby, it is necessary for the purchaser to indicate his personal data, for example, the mailing address, during the ordering process. In case the personal data required for delivering the products or information on the products are already stored in the system, the purchaser has to log into the system in order to authenticate himself to the system. After a successful login, the purchaser, however, has to run through the entire ordering process, in order to be able to complete the order for the product or for the information on the product. This is particularly disadvantageous, if the products or information on the products concerned are gratuitous products or information, for which, besides a valid address for delivery, no further personal data of the purchaser is necessary.

Moreover, it is known to dispatch a newsletter or e-mails to customers or potential customers, by means of which the customers may be informed, for example, about current offers. The newsletter or e-mails may comprise so-called hyperlinks, by means of which the customer is transferred to a specific landing page prepared for that offer, where the customer may initiate an ordering process, as described in the following. Also here, the customer has to run through the entire ordering process, in order to be able to order a product or information on the product.

For both methods mentioned above, it is necessary that a customer also for gratuitous products or information has to run through the entire order process, even if the data required for the delivery to the customer is already stored in the system. Further, the personal data are usually transmitted to the system unsecured such that these data may be picked up by attackers and may be misused.

U.S. Pat. No. 5,960,411 describes a method, according to which a customer may request products via the internet. There it is indeed mentioned that the personal data to be transmitted, as credit card numbers, can be protected from misuse by encrypting the data. However, it is also mentioned there that even the encrypted transmission of the data is not secure, because these may possibly be picked up and decoded by an attacker. For avoiding this problem, U.S. Pat. No. 5,960,411 proposes to transmit as little data as possible. Hereby, however, it is disadvantageous that also these few personal data may be picked up by attackers and—as far as they are encrypted—may be decrypted and misused. The provider of the products, thereby, is not able to find out, whether the order is from the "true" purchaser or from an attacker.

OBJECT OF THE INVENTION

Therefore, it is an object of the present invention to provide solutions which enable an efficient and secure ordering procedure.

SUMMARY

This object is solved according to the invention by a method for requesting an object by means of a client system, which is coupled operatively via a communications network to a server system, as well as a system for requesting an object by means of a client system, which may be coupled via a communications network operatively to a server system according to the independent claims. Preferred embodiments and developments of the invention are specified in the further independent claims and in the respective dependent claims.

Accordingly, a method for requesting an object by means of a client system is provided, which is coupled operatively via a communications network to a server system, wherein
- a server means of the server system receives via the communications network a request message from an electronic document displayed at the client system,
- the request message comprises at least a first parameter, which identifies a user of the client system and a second parameter, which identifies the requested object,
- the server means evaluates the parameters of the request message received, whereby data assigned to the user are determined for the first parameter, and data assigned to the product are determined for the second parameter, whereby the respective data are stored in a storing means of the server system, and
- after a successful evaluation, the requested object is provided for transmission to the user.

Hereby, it is advantageous that for the initiating and the completion of the ordering process only one single message, i.e., the request message of the client system, which is assigned to the user, has to be transmitted to the server means of the server system. Namely, the server means is able to determine by means of the parameters transmitted together with the request message, all data required for the delivery (delivery address and product data), without further inputs of the user being necessary.

The server means may generate the electronic document, and provide it for transmission to the client system, whereby during generation of the electronic document, a text fragment is inserted into the electronic document, which during a client-sided execution, causes a transmission of the request message from the client system to the server means.

It has been found to be advantageous, if the request message comprises a third parameter. Thereby, the transmission of the first and second parameters may be secured, even if the first and the second parameters are transmitted unsecured, i.e., not encrypted.

The third parameter may comprise a value of the first parameter and a value of the second parameter in an encoded form. Thereby, it is advantageously possible, to perform a validity check of the received first and second parameters on the server side. Thus, it is possible to prevent that a user may request an object unauthorized by adding and/or changing the values of the first and/or the second parameters, or that he simply only poses hoax requests.

The text fragment inserted into the electronic document may comprise the first parameter and the second parameter.

In an embodiment of the invention, the text fragment may comprise at least the second parameter, whereby the value of the first parameter—preferably prior to transmission of the electronic document—is transmitted from the server means to the client system, and is stored there, and is transmitted during the transmission of the request message from the client system to the server means together with the request message as first parameter of the request message. Therefore, only the second parameter has to be transmitted with the electronic document to the client system, increasing the security, because in any case on the transmission path from the server means to the client means, the value of the first parameter can no longer be tampered with.

It has been found to be particularly advantageous, if a hash value, preferably a cryptographic hash value, is formed from a combination of the first parameter and the second parameter, which forms the third parameter, whereby the text fragment comprises the hash value as third parameter.

It is advantageous, if the hash value is formed from a combination of the first parameter, the second parameter, and a secret. The secret is not transmitted to the client system.

The secret may comprise a changing state value, preferably a time stamp. Accordingly, the hash value may be formed from a combination of the first parameter, the second parameter and a changing state value, preferably a time stamp. Because the time stamp is generated on the server means, and is only used for the creation of the hash value, it is efficiently avoided that an attacker is able to calculate the hash value by means of the first parameter and the second parameter, because he is missing or does not know the state value (e.g., time stamp) required for the calculation of the hash value.

The hash value or cryptographic hash value may be stored in the storage means, whereby the stored hash value is assigned to the combination of the first parameter and the second parameter.

The secret may be stored in the storage means, whereby the stored secret is assigned to the combination of the first parameter and the second parameter.

The evaluation of the request message may comprise a step, according to which it is checked, if the hash value or cryptographic hash value received with the request message is identical to that hash value, which is assigned to the combination of the first parameter and the second parameter, or which is created by the combination of the first parameter, the second parameter, and the secret. Thereby, it is enabled to advantageously determine, whether the first parameter, the second parameter and/or the hash value has/have been tampered with.

In an embodiment of the invention, the server means may generate a key, whereby the text fragment comprises the key as third parameter, whereby the key is stored in the storage means, and whereby the stored key is assigned to the combination of first parameter and second parameter. Thereby, the key may be generated arbitrarily, for example, the key may be a random value, which is generated independently of the first and/or second parameters.

The evaluation of the request message, hereby, may comprise a step, in which it is checked, whether the third parameter received with the request message is identical to the key assigned to the combination of first parameter and second parameter.

The hash value, the secret and/or the key may respectively be a one-time-hash value, a one-time secret, and a one-time-key, whereby the evaluation of the request message comprises a step, in which the hash value assigned to the combination of first parameter and second parameter, secret and/or key as well as the assignment are deleted. One-time-hash value, one-time secret or one-time key means that the hash value, the secret (or the hash value created by means of the secret) or the key can only be used as third parameter of the request message once. That means that two request messages with identical first and second parameters have a different third parameter value. Thereby, it is avoided—should all three parameters be picked up by an attacker during the transmission of the request message from the client system to the server system—that this request message may be transmitted again to the server system.

Hereby, it is advantageous, if the analyzing of the request message comprises a step, in which the hash value assigned to the combination of first parameter and second parameter, secret and/or key as well as the assignment are deleted.

In an embodiment of the invention, also after successful evaluation of the received request message for the combination of first parameter and second parameter, a time frame is set, whereby the time frame is stored in the storage means, and whereby the stored time frame is assigned to the combination of first parameter and second parameter. It is advantageous, if the evaluation of the request message comprises a step, in which it is checked, if the request message has been received within the time frame. Thereby, it may be checked, whether one and the same request message has been received by the server means multiple times within a certain time frame or time interval.

It is advantageous, if, in case the request message has been received within the time frame, the server means generates a confirmation message, and transfers the latter to the client system, whereby the user of the client system is requested by the confirmation message to confirm the renewed request of the object. Thereby, it is prevented that a user inadvertently requests one and the same object, for example, a certain product, multiple times.

However, it has been found to be advantageous, if the combination of first parameter and second parameter is assigned to a validity interval, whereby the validity interval and the assignment of the validity interval to the parameter combination are stored in the storage means. Thereby, for example, it may be specified that a certain user may request a certain product only within a certain time period, which is determined by the validity interval. Further, thereby the abuse is further restricted, because certain combinations which otherwise are valid for a first parameter value and a second parameter value, only are valid for a certain, preferably, short time period. Request messages, which are received out of the validity time period valid for the parameters, may be rejected or discarded, or a corresponding error message may be transmitted to the sender.

The text fragment inserted into the electronic document may comprise a hyperlink or a code fragment executable on the client side.

The object may comprise information on the object.

The electronic document may comprise at least one of an website, an electronic newsletter, and an electronic message (e-mail).

It is advantageous, if the server means upon a failed evaluation, generates an error message, and transmits it for display at the client system to the client system.

Further, a system for requesting an object with a client system which can be operatively coupled to a server system via a communications network, is provided by the invention, whereby the server system is operatively coupled to a server means, and is adapted to carry out a method according to the invention.

Further, a computer program product is provided, which may be loaded into the internal storage of a computer, and which comprises program sections, by means of which the steps of the method according to the invention may be carried out, if the computer program product is executed on the computer.

Further, a signal sequence, in particular, a computer readable signal sequence and a signal sequence suitable for transmission in a communications network are provided, whereby the signal sequence represents data, by means of which, if loaded into a processor of a computer, a method according to the invention may be carried out.

BRIEF DESCRIPTION OF THE DRAWINGS

Further details and features of the invention may be derived from the following description in connection with the drawing, in which.

DETAILED DESCRIPTION OF THE PREFERRED EMBODIMENTS

Figure 1:
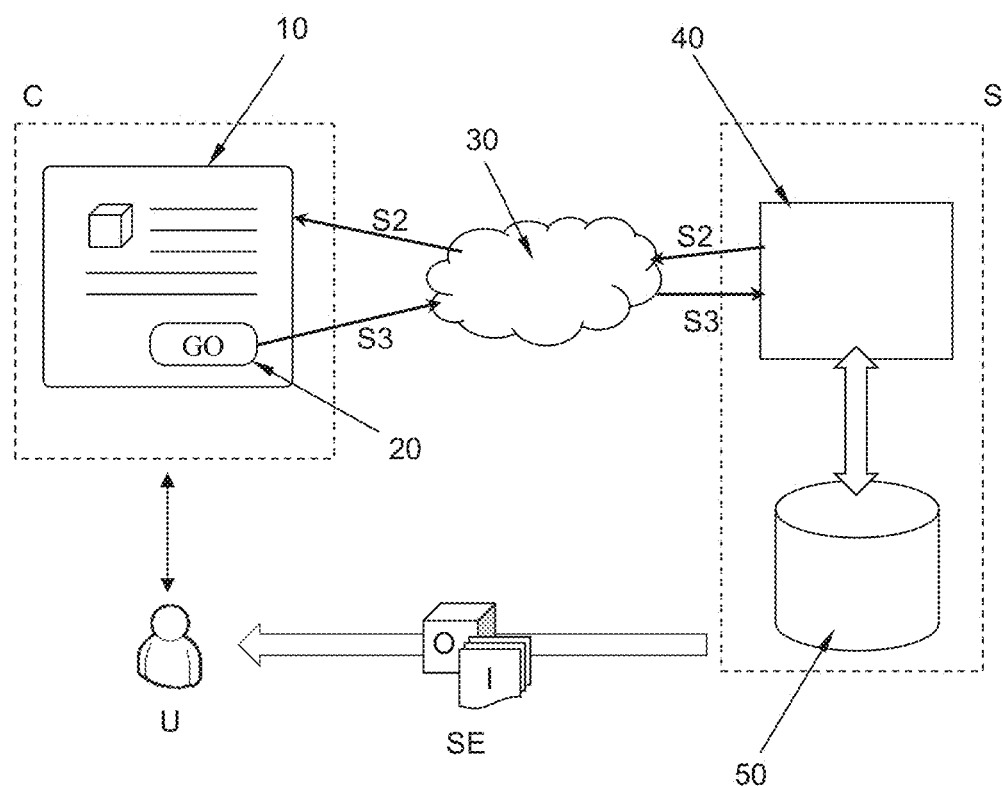
FIG. 1 shows a system comprising a client system and a server system according to the invention, which are coupled or can be coupled to each other via a communications network.

FIG. 1 shows a system comprising a client system C and a server system S, which are coupled or can be coupled to each other via a communications network 30, for example, the internet.

The server system S comprises in the embodiment shown in FIG. 1 a server means 40 and a storage means 50, for example, a data base, which is coupled to the server means 40 operatively. The server means 40 may be, for example, a computer system being adapted to send messages to the client system C or receive messages from the client system C.

The client system C may be a common computer, a tablet PC, a smart phone or the like. The client system C is adapted to request and to receive messages and/or electronic documents, for example, websites, from server means 40, and to display the received documents at a display means.

With respect to the embodiment shown in FIG. 1, the client system C is assigned to a user U, which requests an object O via the client system C. The user U may also request information U on a certain object O via the client system C. The object may, for example, be a certain product or certain additional information on a product or service.

The data assigned to the user U, for example, the delivery address, are stored on the server side in the storage means 50. In the server means 50, there are further stored the data assigned to the objects O or the product information assigned to a product. The user U may request via the client system C information on certain products or certain products, which after completion of the ordering procedure, are sent to the user U, whereby the delivery of a requested product may be carried out by mail or by a shipping company. The delivery of additional information on a certain product may also be carried out via the communications network 30.

In a first embodiment, the user U may request from the server means 40 a certain website, which contains information on a certain product. The website (electronic document 10) will be displayed at the client system C, whereby the website 10 in the embodiment shown here has a control surface 20, by means of which the user U may request the product or information on the product.

By manipulating the control surface 20, a request message is transmitted from the client system C to the server means 40, and is received by the server means 40. The server means 40 evaluates the received request message, and initiates a delivery process, by which the requested product or the requested product information is sent to the user U. In order to initiate the delivery process, no additional information has to be requested from the user U, because all information necessary for the delivery is already included in the request message or is determined from the data of the request message, as will be described in further detail with respect to FIG. 2. Accordingly, the user U only has to manipulate the control surface 20, whereby the entire ordering process is initiated and completed at the same time. Further actions of the user U are no longer necessary.

In a second embodiment, with respect to the electronic document 10, a newsletter or an e-mail may be concerned, which the user U has received at the client system and is displayed there. The newsletter or the e-mail 10 may also comprise a control surface 20, by means of which the user may initiate or complete an ordering process for a product advertised in the newsletter or in the e-mail. Instead of a control surface, also a hyperlink may be provided, whereby manipulation of the control surface as well as manipulation of the hyperlink effects or triggers the transmission of the request message to the server means.

The user U for requesting a product or product information only has to carry out a single action, namely, to manipulate the control surface 20 or a corresponding hyperlink. The entire ordering process thereby is shortened and made more efficient substantially. Further, the order process is also far more secure, because now only a single request message from the client system C has to be transmitted to the server means 40, and because the request message is configured correspondingly, making an abuse or a manipulation nearly impossible, as also will be described in the following with reference to FIG. 2.

Figure 2:
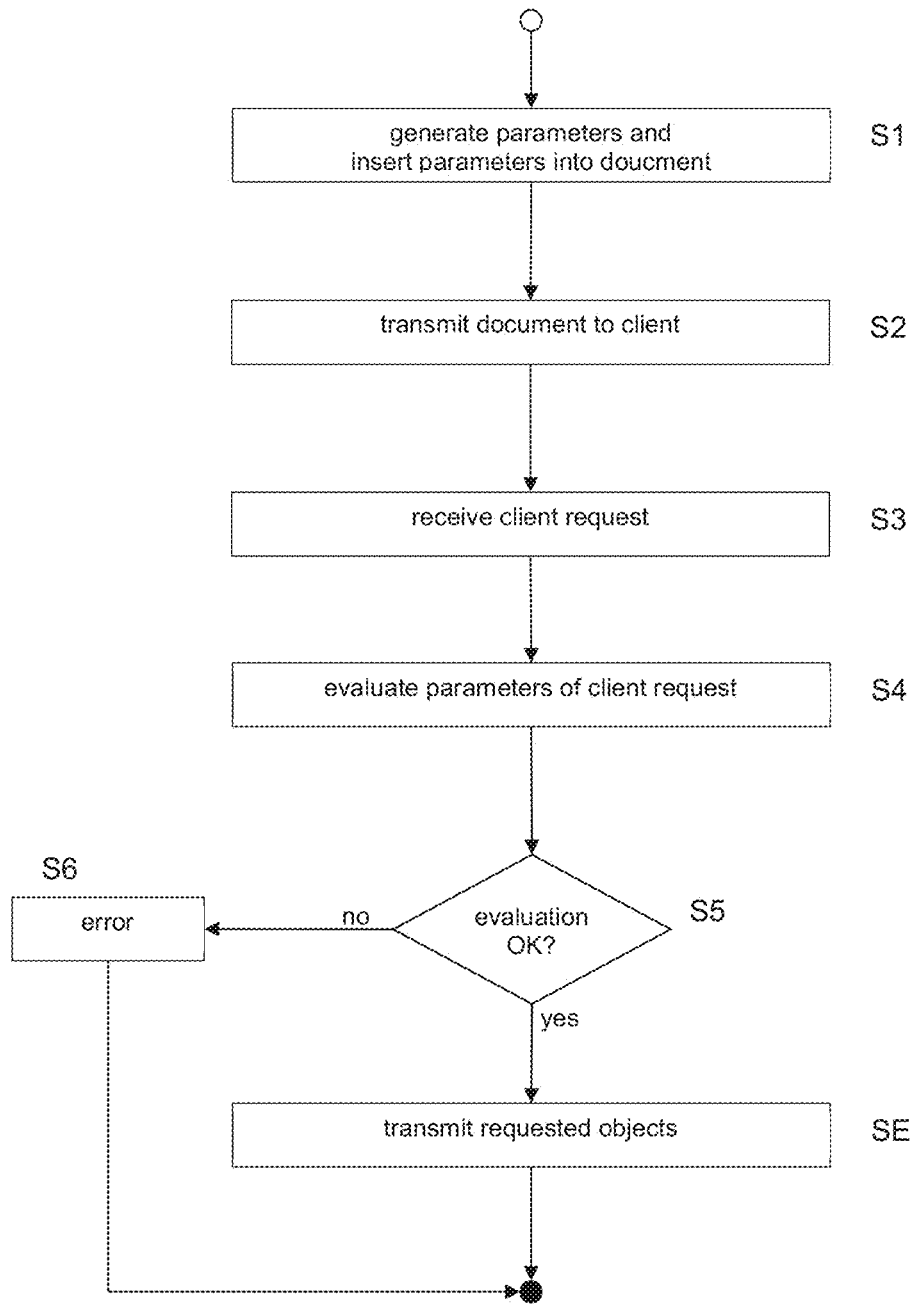
FIG. 2 shows a flow chart of the method according to the invention for requesting an object by means of a client system, which is coupled to a server system.

FIG. 2 shows a flow chart of a method according to the invention for requesting an object by means of a client system.

In a first step S1, the server means 40 generates an electronic document, for example, a website or a newsletter. In the electronic document, a text fragment is inserted, which effects a transmission of a request message from the client system to the sever means 40 upon a client-sided execution. The text fragment may, for example, be a hyperlink or a control surface. Further, in the step S1, parameters are generated and are inserted into the electronic document. The inserted parameters, thereby, are so-called URL parameters of the hyperlinks or the control surface. A first URL parameter identifies the user of the client system. A second URL parameter identifies a product or service advertised in the electronic document.

The hyperlink comprising the two parameters may be structured, for example, as follows:

https://www.example.com/
newsletter?UserID=002wTIR&ProductID=0t2 AAQ

In the example of a hyperlink shown above, the first parameter "UserID" identifies the user of the client system, and the second parameter "ProductID" the product advertised by the website or the newsletter. With a click on the control surface or on the hyperlink, a request message is transmitted from the client system C to the server means 40, which comprises the two parameters mentioned above.

The first parameter, which identifies the user U, does not necessarily have to be inserted as component of the hyperlink into the electronic document. With respect to a website, this parameter may also be transmitted together with the header of the website to the client system, and may be stored there as so-called cookie. The data of the cookie then are transmitted together with the request message to the server means 40.

In addition to the parameters mentioned above, for increasing the security, yet a third parameter may be provided, which also is inserted into the electronic document as an URL-parameter.

The hyperlink which is additionally provided with a third parameter may, for example, be structured as follows:
https://www.example.com/
newsletter?UserID=002wTIR&ProductID=0t2
AAQ&Secret=1b55b60bb3e6e04f399fbb581bbe1def The third parameter "Secret" may comprise the value of the first parameter and the value of the second parameter in encoded form. For example, the third parameter may be a hash value, preferably, a cryptographic hash value, which is formed from a combination of the values of the first parameter and the second parameter. By means of this third parameter or by means of this hash value, the server means 40 is enabled to check, whether the first and second parameters transmitted with the request message are valid or whether the two first parameters have been manipulated. The hash value or cryptographic hash value is generated by the server means 40 or calculated, and is stored in the storage means 50. The stored hash value, thereby, is assigned to the combination of the first parameter and the second parameter.

For an even further increase of the security with respect to manipulation, the hash value may be formed from a combination of the value of the first parameter, the value of the second parameter, and a secret. The secret may, for example, be a changing state value. The changing state value may, for example, be a time stamp. The secret or the time stamp is only used for calculation of the hash value, and subsequently is discarded again. Because for the calculation of the hash value, the values of the first two parameters as well as also the time stamp are used, for an attacker it is nearly impossible to calculate the hash value without knowledge of the time stamp.

Instead of the time stamp, also an arbitrary random number or another, preferably, frequently changing value may be used. For the server-sided validation after receipt of the request message, the time stamp used for the calculation of the hash value is no longer necessary, because the hash value is stored in the storage means 50, and is assigned to the combination of first parameter and second parameter.

Instead of a hash value as third parameter, the server means may generate a key, whereby the text fragment comprises the key as third parameter. The key, hereby, is generated independently from the two first parameters such that from the first two parameters, no drawbacks to the third parameter may be made. The key may, for example, be an arbitrary random number or arbitrary number-character-combination. The key is also stored in the storage means assigned to the combination from first parameter and second parameter.

After the document has been generated completely, and the text fragment, i.e., the hyperlink or the control surface, is inserted into the document, in the step S2, the document is transmitted to the client system C, and is displayed there. The user U may now manipulate the control surface or may click on the hyperlink, whereby a request message, which comprises the parameters described above, is transmitted from the client system C to the server means 40.

In the step S3, the server means 40 receives the request message of the client system C.

In the subsequent step S4, the parameters of the received request message are evaluated by the server means 40. As far as the first parameter is stored in the client system C in form of a cookie, the server means 40 also receives the date of the cookie together with the request message, and evaluates the latter also in the step S4.

In the simplest case, the server means 40 during evaluation of the request message checks, whether the values of the first parameter and of the second parameter are valid. In case the values of the first two parameters are valid, the server means determines the data assigned to the two first parameters, which are also stored in the storage means 50. These data may, for example, comprise the delivery address of the user identified by the first parameter. The validity of the values of the first two parameters is checked in the step S5, and with successful checking, the requested object O or the requested information on a certain object, for example, product information, may be sent to the user U.

In an improved embodiment, the server means 40 also receives the third parameter, which represents the hash value for the first two parameters or the key, and checks, whether the hash value or the key matches the combination of first parameter and second parameter.

For this, the hash value stored in the storage means 50 for this parameter combination is read out, and is compared to the hash value received with the third parameter. In case both hash values are identical and the values of the first two parameters are valid, the latter being checked respectively in the step S5, the requested object or the requested product information may be dispatched in the step SE. For the received key, an analogous procedure is carried out.

The checking, whether the received hash value is identical to the hash value stored for the parameter combination, may be carried out independently of whether the hash value has been formed using a changing state value, for example, a time stamp.

In order to increase the security even further, it is provided for discarding, for example, deleting, or marking as invalid, the hash value or key assigned to the combination of first and second parameters, after the receipt and evaluation of the request message. Thereby, it is achieved that a receipt and evaluation of a second request message, having identical parameters with respect to the first request message, leads to an erroneous evaluation, because the received third parameter of the second request message is not valid or may not be validated. In case an attacker would intercept the first request message transmitted to the server system, and transmit the latter (as second) request message to the server system, this second request message would be rejected by the server system. With respect to the hash values or keys, hereby, so-called one-time-hash values or one-time keys are concerned.

In an even further improved embodiment of the invention, after generating the parameters or after inserting the parameters into the electronic document to the generated or inserted parameter combination, a time frame may be set. The time frame is also stored in the storage means 50, and assigned to the combination of first parameter and second parameter. By means of the time frame, during evaluation of the received request message it may be checked, whether one and the same request message (as far as no one-time-hash values or one-time-keys have been used) may be received within the time frame multiple times. Is this the case, the server means 40 may generate a confirmation message and transmit the latter to the client system, in order to request the user U to confirm the renewed request of the object. Thereby, it is avoided that the user U erroneously requests one and the same object multiple times.

Alternatively or additionally to the time frame mentioned above, the combination of first parameter and second parameter may be assigned to a validity interval. The validity interval and the assignment of the validity interval to the parameter combination are also stored in the storage means 50. With the validity interval it may be indicated, in which time frame corresponding request messages are valid at all. Thereby, on the one hand, a temporal limitation may result, within which a certain product or certain information may generally be requested. On the other hand, the possibility of an abuse of the request message may be further reduced, because a request message received outside of the validity interval for a certain combination of first and second parameters will be discarded by the server means 40 without the third parameter having to be evaluated. In an embodiment of the invention, the user U may be informed about the received request message having been invalid.

For a certain parameter combination, accordingly, a validity interval may comprise several time frames. A time frame may at the maximum be as long as the validity interval.

It should be noted that the validity interval mentioned above and the time frame mentioned above do not have anything to do with a validity period or a time out of an internet of HTTP session. The validity interval as well as also the time frame may extend over several internet or HTTP sessions. Vice versa, an internet or HTTP session may also comprise several validity intervals or time frames.

For example, the validity interval for a certain parameter combination may amount to 1 week, while an internet or HTTP session within which request messages from a certain client means may be received may have a maximum validity duration of one day and will be, for example, automatically terminated after expiration of the validity duration. Further, the validity interval and/or the time frame may be still valid after a time out of the internet or HTTP session.

In case the evaluation of the parameters or the request message carried out in step S4 leads to an error, in the step S5, the method branches off to the step S6, in which the server means 40 generates an error message, and is transmitted to the client system for being displayed at the client system. Otherwise, the requested object or the requested information may be sent to the user U.

Above, an embodiment of the invention has been described, in which the text fragment inserted into the electronic document comprises a hyperlink or a control surface. Alternatively, the text fragment may comprise a code fragment executable on the client side, for example, JavaScript code. Within the JavaScript code, the values of the parameters may be defined, for example, as variables or constants. The code fragment executable on the client side is adapted to generate upon a click on the control surface or upon a click onto the hyperlink, a corresponding request message and to transmit the latter to the server means 40.

The invention described above may be employed for websites or electronic newsletters as well as for e-mails. Due to the parametrization of the hyperlink or the code fragment executable on the client side, the user or the recipient of the newsletter or the e-mail only has to carry out a single action, i.e., to activate the hyperlink or the control surface, in order to request a product or product information. By means of the parameters, the server means 40 is able to determine all data required for the delivery of the product or the product information from the server means 50, and to initiate the delivery.

For the user U, the ordering process thereby is substantially shorter, less time-consuming, and thereby more efficient. By providing a hash value, keys and/or a validity period, within which the request message is valid, the security is substantially increased, and a manipulation of the parameters is substantially hampered or may be recognized reliably by the server means 40.

REFERENCE NUMERALS

10 electronic document (e.g., website, newsletter, or e-mail)
20 control surface in the electronic document (e.g., button or link)
30 communications network (e.g., internet)
40 server means
50 storage means (e.g., data base)
C client system
I information on the object
O object (e.g., product)
S server system
S1 to S6 steps of the method according to the invention
SE last step of the method according to the invention
U user

What is claimed is:

1. A method for requesting an object (O) by means of a client system (C), which is coupled to a server system (S) via a communications network (30) operatively, the method comprising:

a server means (40) of the server system generating (S2) an electronic document (10) and transmitting the electronic document to the client system (C), inserting, at the server means, a text fragment into the electronic document during generation of the electronic document, wherein, during a client-sided execution, the electronic document effects a transmission of a request message from the client system to the server means (40), wherein the text fragment comprises a first parameter and a second parameter, assigning the combination of the first parameter and the second parameter to a validity interval, wherein the validity interval and the assignment of the validity interval to the parameter combination are stored in a storage means (50) of the server system, and wherein the validity interval indicates a time period during which corresponding request messages are valid, receiving via the communications network, at the server means (40) the request message from the electronic document (10) displayed at the client system, wherein the first parameter identifies a user (U) of the client system and the second parameter identifies the requested object, evaluating, at the server means, the parameters of the received request message, wherein data for the first parameter assigned to the user and data for the second parameter assigned to the object are determined, wherein the respective data are stored in the storage means (50), and after a successful evaluation, providing the requested object (O) for transmission (SE) to the user (U), and after a successful evaluation of the received request message, determining a time frame for the combination of the first parameter and the second parameter, wherein the time frame is stored in the storage means (50), wherein the stored time frame is assigned to the combination of the first parameter and the second parameter, and determining during evaluation of the received request message whether the same request message is received within the time frame multiple times.

2. The method of claim 1, wherein the request message comprises a third parameter.

3. The method of claim 2, wherein the third parameter comprises the value of the first parameter and the value of the second parameter in encoded form.

4. The method of claim 2, wherein a hash value is formed from a combination of the first parameter and the second parameter, which forms the third parameter, and wherein the text fragment comprises the third parameter.

5. The method of claim 4, wherein the hash value is formed from a combination of the first parameter, the second parameter, and a secret, wherein the secret is not transmitted to the client system.

6. The method of claim 1, wherein the secret comprises a changing state value, preferably.

7. The method of claim 4, wherein the hash value and/or a secret are/is stored in the storage means (50), and wherein the stored hash value and/or the stored secret are/is assigned to the combination of the first parameter and the second parameter, and wherein the secret is not transmitted to the client system.

8. The method of claim 4, wherein the evaluation of the request message comprises determining whether the hash value received with the request message is identical to an independently generated hash value assigned to the combination of first parameter and second parameter, or which is formed from the combination of the first parameter, the second parameter, and a secret, wherein the secret is not transmitted to the client system.

9. The method of claim 2, wherein the server means (40) generates a key, wherein the text fragment comprises the key as the third parameter, wherein the key is stored in the storage means (50), and wherein the stored key is assigned to the combination of first parameter and second parameter.

10. The method of claim 1 wherein the evaluation of the request message comprises determining whether the third parameter received with the request message is identical to a key assigned to the combination of the first parameter and the second parameter.

11. The method of claim 7, wherein the hash value, the secret and/or a key respectively are a one-time-hash value, a one-time-secret, and a one-time-key, wherein the evaluation of the request message comprises deleting the hash value, the secret and/or the key assigned to the combination of first parameter and second parameter.

12. The method of claim 1, wherein, if a new request message is received during the time frame, the server means (40) generates a confirmation message and transmits it to the client system (C), wherein the user (U) of the client system is requested by the confirmation message to confirm the new request of the object (O).

13. The method of claim 1, wherein the electronic document (10) comprises at least one of a website, an electronic newsletter, and an electronic message (e-mail).

14. The method of claim 1, wherein after a failed evaluation, the server means (40) generates an error message, and transmits it to the client system for display at the client system (C).

* * * * *